(12) United States Patent
Brkovic

(10) Patent No.: US 6,711,039 B2
(45) Date of Patent: Mar. 23, 2004

(54) METHOD AND APPARATUS FOR CONTROLLING SYNCHRONOUS RECTIFIERS OF A POWER CONVERTER

(75) Inventor: Milivoje Slobodan Brkovic, Carlsbad, CA (US)

(73) Assignee: di/dt, Inc., Carlsbad, CA (US)

( * ) Notice: Subject to any disclaimer, the term of this patent is extended or adjusted under 35 U.S.C. 154(b) by 0 days.

(21) Appl. No.: 10/187,562

(22) Filed: Jul. 2, 2002

(65) Prior Publication Data

US 2003/0021128 A1 Jan. 30, 2003

Related U.S. Application Data

(60) Provisional application No. 60/303,208, filed on Jul. 5, 2001.

(51) Int. Cl.[7] .................... H02M 7/217; H02M 3/335
(52) U.S. Cl. .................. 363/127; 363/56.02; 363/20
(58) Field of Search ................ 363/25, 49, 56.02, 363/57, 68, 96, 81, 97, 89, 127, 20; 323/222, 225, 259, 281

(56) References Cited

U.S. PATENT DOCUMENTS

| | | | | |
|---|---|---|---|---|
| 4,597,038 A | * | 6/1986 | Stacey | 366/56 |
| 4,682,278 A | * | 7/1987 | Marquardt et al. | 363/58 |
| 4,922,404 A | * | 5/1990 | Ludwig et al. | 363/89 |

* cited by examiner

*Primary Examiner*—Rajnikant B. Patel
(74) *Attorney, Agent, or Firm*—Lowenstein Sandler PC

(57) ABSTRACT

For use in a power converter having a power switch and a synchronous rectifier device coupled between input and output thereof, a control circuit, method of disabling a synchronous rectifier device and power converter employing the control circuit and method. In one embodiment, the control circuit includes a synchronous rectifier controller, coupled to the output of the converter and the synchronous rectifier device, that senses time derivative of the output voltage and disables the synchronous rectifier when derivative is negative and greater than a predetermined magnitude.

29 Claims, 6 Drawing Sheets

METHOD AND APPARATUS FOR CONTROLLING SYNCHRONOUS RECTIFIERS OF A POWER CONVERTER

This application claims the priority benefit of U.S. Provisional Application No. 60/303,208, filed Jul. 5, 2001, hereby incorporated herein by reference.

FIELD OF INVENTION

This invention generally concerns synchronous rectifiers and more particularly relates to a means for providing a simple controller for synchronous rectifiers during start-up into pre-biased output voltage.

BACKGROUND DISCUSSION

Whenever a converter employs synchronous rectification a problem arises during the start-up (turn-on) period if the output voltage of the converter is non-zero, but has some positive voltage. This is a common problem in systems where different voltages are required and the sequence in which they are enabled is well defined. Typically, the converter with the lowest voltage is started first and the converter with the highest voltage is started last. Parasitic diodes in integrated circuits (ICs) cause the converter with the higher voltage (for example, 3.3 V) to "see" a lower voltage on its output from the lower output voltage converter (for example, 2.5 V or less), even before it is enabled. If proper control of synchronous rectifiers is not employed, sag in the output voltage of the lower output voltage converter will occur and likely result in a current limit and latch of both converters. A similar problem occurs when converters with synchronous rectifiers are connected in parallel without OR-ing diodes and are started in sequence rather simultaneously.

If possible it would be advantageous to disable the synchronous rectifiers during start-up and then enable them again. Unfortunately, the solution to this problem is not that simple. Even if synchronous rectifiers were disabled during start-up, sudden enabling of them after the output voltage reached its nominal value causes an undesired huge negative current of the converter and a drop in output voltage, particularly if no load or a minimum load is applied.

Turn-off transients are also important system concerns. If the synchronous rectifier, connected across the output, commonly through an inductor, is not disabled or well controlled during this transition, a negative voltage at the output can occur due to resonance between an inductor and an output capacitor in a loop with the synchronous rectifier. Since it is a current bi-directional device, the synchronous rectifier allows negative inductor current flow that results in a negative output voltage, which, in most cases will destroy the load. This problem may also occur when two or more converters are connected in parallel.

Accordingly, what is needed in the art is a system and method that provides improved control of synchronous rectifiers during these transient conditions associated with a power converter.

SUMMARY OF THE INVENTION

To address the above-discussed deficiencies if the prior art, the present invention provides for use in a power converter having a power switch and a synchronous rectifier device coupled between input and output thereof, a control circuit, method of disabling a synchronous rectifier device and power converter employing the control circuit and method.

In one embodiment, the control circuit includes a synchronous rectifier controller, coupled to said synchronous rectifier device, that senses a time derivative of the output voltage of the power converter and disables said synchronous rectifier device when said time derivative is negative and greater than a predetermined magnitude.

In one embodiment of the present invention, the synchronous rectifier device is coupled across the output of the power converter via an inductor. However, the present invention is equally applicable to a synchronous rectifier device located at any position associated with the power converter.

In one embodiment of the present invention, the power converter further includes a plurality of synchronous rectifier devices. The synchronous rectifier controller is adapted to disable at least one of the plurality of synchronous rectifier devices. In a related, but alternative embodiment, the power converter further includes a plurality of power switches. The present invention is equally applicable to any power topology either non-isolated or isolated employing at least one synchronous rectifier device.

In one embodiment of the present invention, the synchronous rectifier controller comprises at least one logic gate to enable or disable corresponding at least one synchronous rectifier; and differentiating means for sensing said time derivative of said output voltage. The differentiating means comprises a comparator having an inverting input and a non-inverting input, a resistor network wherein the resistance of each said resistor is chosen to determine the steady state voltages at said inverting and non-inverting inputs of said comparator and said predetermined magnitude of transient and a capacitor coupled between said output of said power converter and said one input of said comparator, the capacitance of said capacitor together with resistance of said resistors connected to said one input of said comparator define a time constant, said time constant is chosen of sufficient length to allow for proper operation of said power converter during turn-on into said output with a nonzero voltage present. Of course, other controllers capable of sensing the negative derivative of the output voltage and disabling the synchronous rectifier device under certain conditions are well within the broad scope of the present invention.

In one embodiment of the present invention the synchronous rectifier controller further comprises an ON/OFF circuit for disabling the comparator after converter is turned-on and output voltage is in regulation. The ON/OFF circuit disables the comparator after predetermined time from the moment when said converter is turned-on. In related, but alternative embodiment, the ON/OFF circuit senses the output voltage of the power converter and disables the comparator when the output voltage reaches predetermined percentage of its nominal value during turn-on sequence.

Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWING

The objects, advantages and features of the invention will be more clearly perceived from the following detailed description, when read in conjunction with the accompanying drawing, in which.

DETAILED DESCRIPTION OF THE PREFERRED EMBODIMENTS

Figure 1:
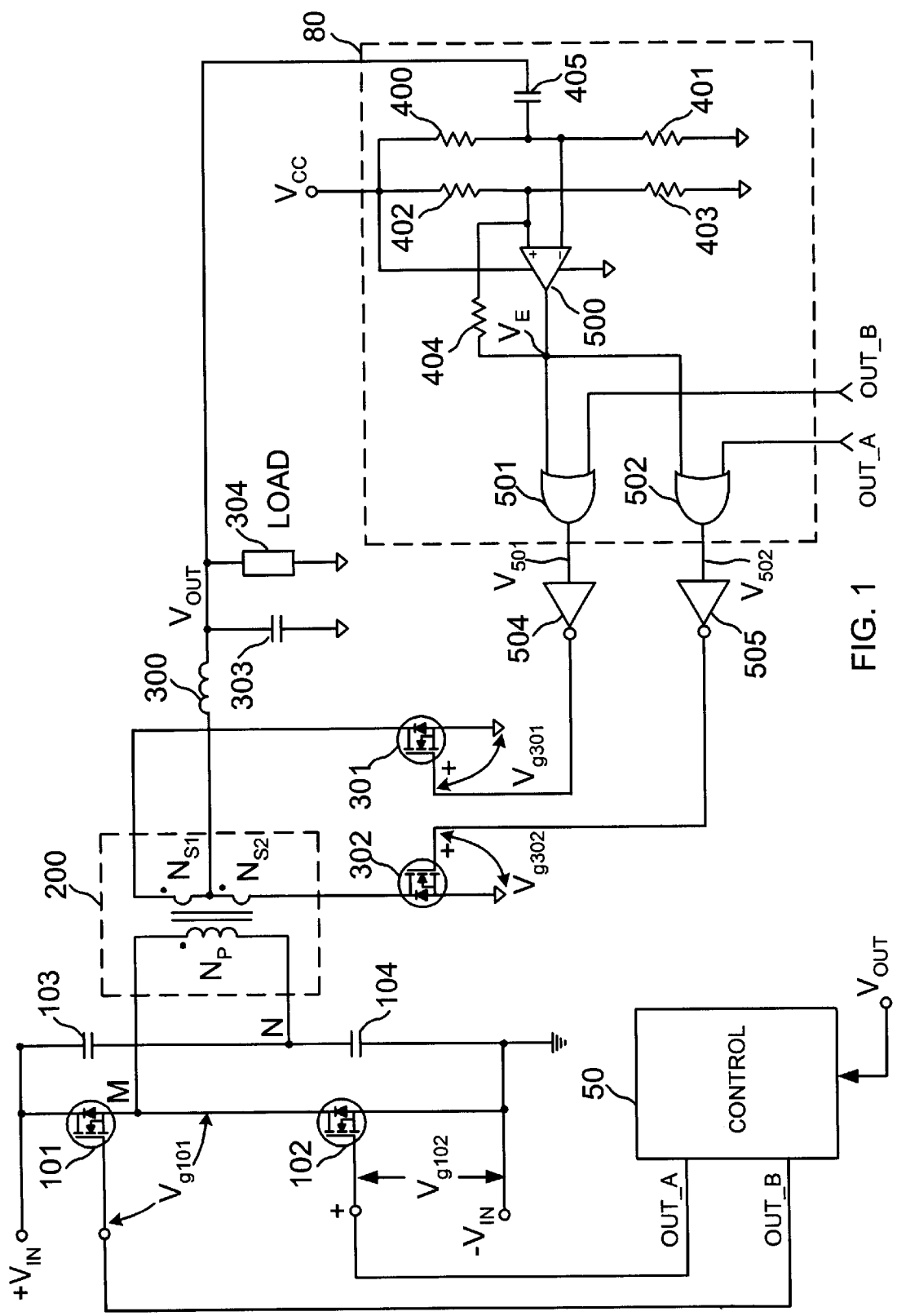
FIG. 1 is a schematic diagram of the controller of one embodiment of the invention as it interrelates with a half-bridge converter.
Figure 2:
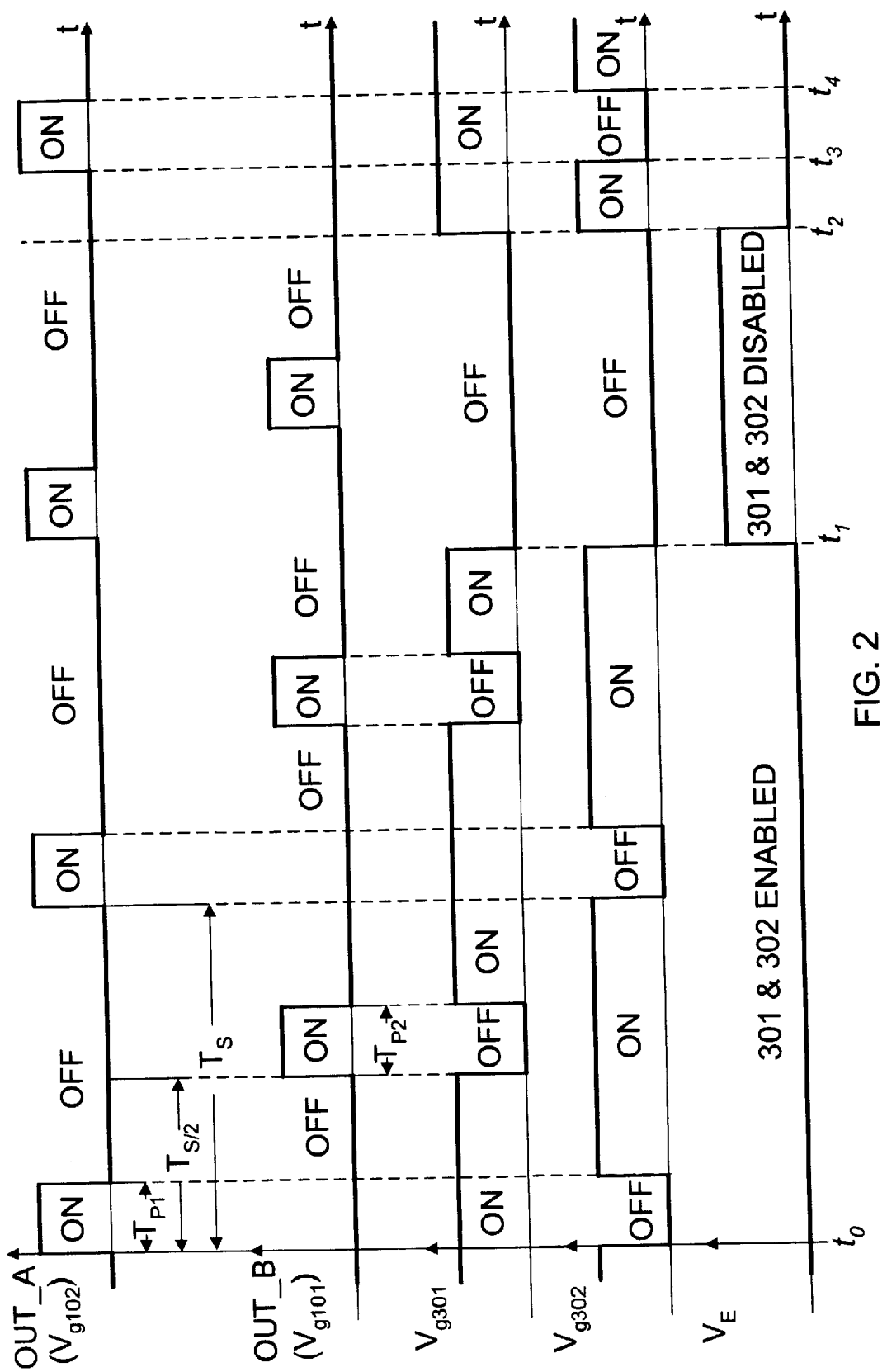
FIG. 2 is a drive-pulse timing diagram showing of the controller of FIG. 1.

With reference now to the drawing, as an example, and more particularly to FIG. 1, a half-bridge converter is shown with the controller of the invention. Primary switches 101, 102, synchronous rectifiers or switches 301 and 302, capacitors 103 and 104, transformer 200, and inductor 300 form a half-bridge DC-to-DC converter. The invention could also be embodied in any topology including non-isolated (for example, synchronous: buck, boost, buck boost, Cuk converters, among others) as well as isolated DC-DC converters employing synchronous rectification (for example, forward, flyback, SEPIC, ZETA, Cuk, push-pull, full-bridge converters, among others). Input voltage $V_{IN}$ is split with capacitors 103 and 104. One side of primary winding $N_P$ of transformer 200 is connected to the common node N of these capacitors while the second end is connected to the common node M of switches 101 and 102. Two secondary windings $N_{S1}$ and $N_{S2}$ are connected in series. Common point 201 of these windings is connected to one end of output inductor 300 and second end of the output inductor is connected to capacitor 303 which is connected across the output of the converter $V_{OUT}$ and load circuit 304. The second end of winding $N_{S1}$ is connected to synchronous rectifier (switch) 301 while the second end of winding $N_{S2}$ is connected to synchronous rectifier (switch) 302. The polarity of the windings of transformer 200 is chosen such that when switch 101 is on, synchronous rectifier 301 is off and rectifier 302 is on. In contrast, when switch 102 is on, synchronous rectifier 301 is on and rectifier 302 is off. When both switches 101 and 102 are off, rectifiers 301 and 302 are both on. Synchronous rectifiers 301 and 302 are driven with drivers 504 and 505, respectively. These drivers are inverting but they can also be non-inverting with appropriate replacement of logic gates 501 and 502 and swapping inputs of comparator 500. Salient waveforms of drive pulses for primary side switches 101 and 102 and synchronous rectifiers 301 and 302 are shown in FIG. 2. Switches 101 and 102 are both exemplified as MOSFETs, but may also be realized as isolated gate bipolar transistors (IGBTs) or bipolar transistors.

Output voltage $V_{OUT}$ is sensed and fed into control circuit 50 which generates drive pulses OUT_A and OUT_B for primary side switches 102 and 101, respectively, in order to adjust the operating parameter of the converter. The control circuit includes an amplifier, a reference voltage, a modulator (PWM type for example), two driver stages generating out-of-phase outputs OUT_A and OUT_B, and ON/OFF logic. It also can include additional protection features very often found in converters, but they are not relevant for the purpose of the present invention, and are thus not included here. An isolation feedback circuit is omitted for simplicity.

The circuit for detecting the negative slope of output voltage $V_{OUT}$ comprises comparator 500, resistors 400, 401, 402, 403 and 404, and capacitor 405. Resistors, 400, 401, 402, 403 and 404 are selected such that, in one embodiment, the voltage at the inverting input of comparator 500 (defined by the resistor divider comprising resistors 400 and 401) is lower than the voltage at the non-inverting input of comparator 500 (defined by the resistor divider comprising resistors 402, 403, and hysteresys resistor 404) resulting in low logic level signal $V_E$ on the output of comparator 500. Capacitor 405 is connected between inverting input of comparator 500 and output voltage $V_{OUT}$, and together with resistors 400 and 401 forms an RC differentiator circuit with a time constant determined by the capacitance of capacitor 405 and the resistance of the parallel combination of resistors 400 and 401. Comparator output signal $V_E$ is fed into the first input of two input logic OR gates 501 and 502. Drive pulses OUT_A and OUT_B are fed into the second input of logic gates 502 and 501, respectively. Output $V_{501}$ of logic gate 501 is fed into driver 504 while output $V_{502}$ of logic gate 502 is fed into driver 505.

With reference to FIG. 2, during normal operation of the converter, output $V_E$ of comparator 500 is at low logic level and does not have an effect on the drive waveforms for synchronous rectifiers 301 and 302. When OUT_A is high, primary side switch 102 and synchronous rectifier 301 are on, while OUT_B is low and both primary switch 101 and synchronous rectifier 302 are turned-off. Pulse OUT_A goes low after time $T_{P1}$ and primary switch 102 is turned-off, while synchronous rectifiers 301 and 302 are both on and primary switch 101 is still off. OUT_B goes high after half of the switching period $T_S$ $T_S/2$, synchronous rectifier 301 is turned-off, while synchronous rectifier 302 is still on, primary switch 102 is still off and primary switch 101 is turned-on. After time $T_{P2}$, OUT_B is low, OUT_A is still low and both primary switches 101 and 102 are off, while both synchronous rectifiers 301 and 302 are on. At the end of switching period $T_S$, the sequence repeats.

When output $V_E$ of comparator 500 goes high at time t=$t_1$, as shown in FIG. 2, output $V_{501}$ of logic gate 501 goes high regardless of OUT_B and output $V_{502}$ of logic gate 502 goes high regardless of OUT_A. Consequently, both synchronous rectifiers 301 and 302 are turned-off and stay disabled as long as $V_E$ is logic high. When $V_E$ goes low at time t=$t_2$, normal operation of the synchronous rectifiers resumes.

If the output of the converter was pre-biased from a voltage source with voltage $V_1$ (for example, the output of another converter) when the converter was turned-on, output voltage $V_{OUT}$ tends to drop from its initial value $V_1$, once the converter is turned-on and the synchronous rectifiers are enabled (turned-on). The main reason for this is the following: in order to provide a soft-start of the converter, the pulse widths of the OUT_A and OUT_B, $T_{P1}$ and $T_{P2}$ are increased from zero in the beginning to a steady state value as soon as output voltage $V_{OUT}$ is in regulation. Since in the beginning, just after start-up, OUT_A and OUT_B are very narrow pulses, synchronous rectifiers are turned-on for almost the entire duration of the switching period $T_S$, causing volt-second balance on inductor 300 to be negative, thus resulting in negative average inductor current, which is supplied from pre-biased source $V_1$. This negative inductor current, if not well controlled, will overload voltage source $V_1$ resulting in a drop in output voltage $V_{OUT}$ and even activating the overload protection in voltage source $V_1$ thus, preventing start-up into pre-biased voltage.

Resistors 400, 401, 402, 403 and 404 are chosen such that in normal operation the voltage at the non-inverting input ($V_+$) of comparator 500 is lower than at the inverting input ($V_-$), thus resulting in low logic level signal $V_E$ at its output. When $V_E$ is low, operation of synchronous rectifiers 301 and 302 is not affected. For this case, the voltage at the non-inverting input of comparator 500 is:

$$V_+^L = V_{cc} \cdot \frac{(R_{403})\|(R_{404})}{(R_{403})\|(R_{404}) + R_{402}} \quad \text{(Eq. 1)}$$

where, $$R_{403}\|R_{404} = \left\|\frac{R_{403} \cdot R_{404}}{R_{403} + R_{404}}\right\|,$$

indicates a parallel combination of the resistors 403 and 404, and $V_{CC}$ is the supply voltage for comparator 500.

Similarly, assuming that output voltage $V_{OUT}$ is in regulation, that is, $$\frac{dV_{OUT}}{dt} = 0,$$

the voltage at the inverting input of comparator 500 is:

$$V_- = V_{cc} \cdot \frac{R_{401}}{R_{401} + R_{400}} > V_+ \quad \text{(Eq. 2)}$$

Comparator 500 will change its output $V_E$ to a logic high whenever $V_{31} > V_+$, that is, whenever $dV_{OUT}/dt < 0$. When $V_E$ is at logic high level, the voltage at the non-inverting input of comparator 500 is:

$$V_+^H = V_{cc} \cdot \frac{(R_{403})\|(R_{404})}{(R_{403})\|(R_{404}) + R_{402}} + V_{cc} \cdot \frac{(R_{403})\|(R_{402})}{(R_{403})\|(R_{402}) + R_{404}} \quad \text{(Eq. 3)}$$

Figure 3:
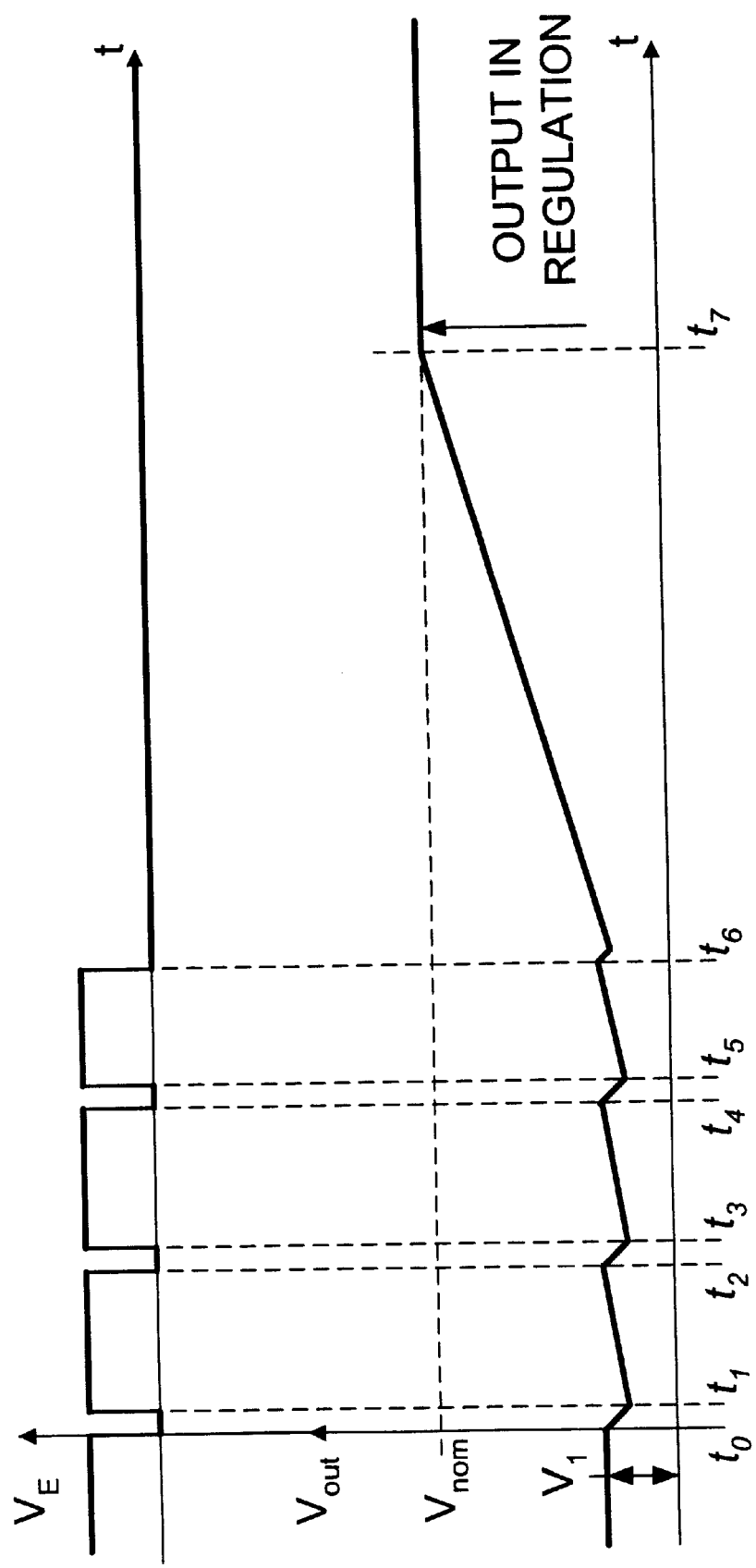
FIG. 3 are waveforms of the enable signal for synchronous switches and the output voltage during start-up of converter of FIG. 1.

Voltage difference $V_+^H - V_+^L$ defines hysteresis $V_H$ of comparator 500. FIG. 3 shows the waveforms of $V_E$ and $V_{OUT}$ during start-up into pro-biased voltage. Before the converter is turned-on at t=0, there was voltage $V_1$ applied to the output of the converter. The output voltage starts dropping until time $t=t_1$, at which voltage $V_E$ becomes logic high and synchronous rectifiers 301 and 302 are turned-off, allowing output voltage $V_{OUT}$ to rise till time $t=t_2$, at which time voltage $V_E$ goes logic low, rectifiers 301 and 302 are turned-on again, and $V_{OUT}$ starts dropping again. At time $t=t_3$, $V_E$ goes logic high, synchronous rectifiers 301 and 302 are turned-off and $V_{OUT}$ rises again. This process repeats until time $t=t_6$ at which time pulses OUT_A and OUT_B are wide enough pulses to provide positive volt-second balance on output inductor 300 with the synchronous rectifiers enabled. After time $t=t_6$ the converter resumes normal operation as if there is no pre-biased voltage and reaches its nominal value $V_{nom}$ after time $t=t_7$. During time t=0 and $t=t_6$, output voltage $V_{OUT}$ is oscillating with magnitude $V_H$ and with average positive slope.

By disabling the synchronous rectifiers, the converter is protected from having negative net output current and consequently loading output of the source of the voltage $V_1$ (very often another converter). Capacitor 405 provides only AC coupling from the output of the converter to resistor dividers 400 and 401. Capacitor 405 together with $R_{400}\|R_{401}$ forms a differentiator. Time constant, $\tau = C_{405} \cdot (R_{400}\|R_{401})$ is chosen to be long enough to allow proper operation of the converter during turn on into pre-biased output (for example, greater than time $t_6$ in FIG. 3). Depending on the application, time constant $\tau$ will be approximately between a few hundred microseconds and one millisecond.

The invention shown in FIG. 1 also provides well controlled behavior of the converter during its turn off. Namely, comparator 500 disables the synchronous rectifiers during the turn off transient and prevents a negative net current in inductor 300, thus preventing negative voltage on capacitor 303 and across load circuit 304 during the turn off transient.

With specific reference to FIG. 3, at t=0, $V_{OUT} \neq 0$, that is, it is pre-biased. At this moment the module is turned-on. Whenever $V_{OUT}$ tends to go down, $V_E$ goes high and disables synchronous rectifiers 301 and 302. Also inductor current $I_L$ goes negative whenever $V_{OUT}$ drops. The output voltage bounces around the pre-biased value until the duty cycle of the module is high enough to provide a rise in output voltage at time $t=t_7$. Therefore, a large negative voltage transient is avoided as would occur if the converter were suddenly enabled in a pre-biased condition.

Figure 4:
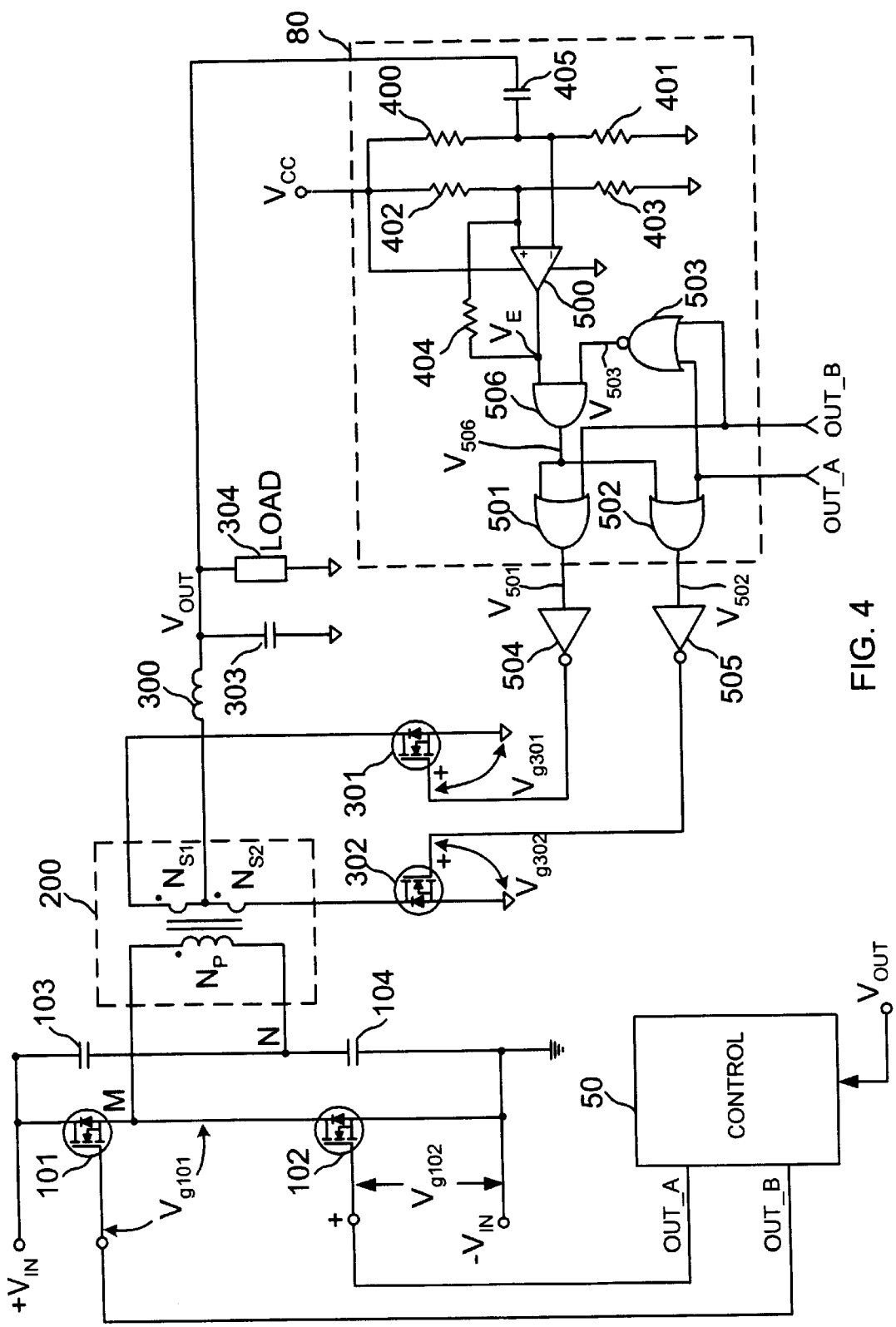
FIG. 4 is an alternative embodiment of the controller of the invention.
Figure 5:
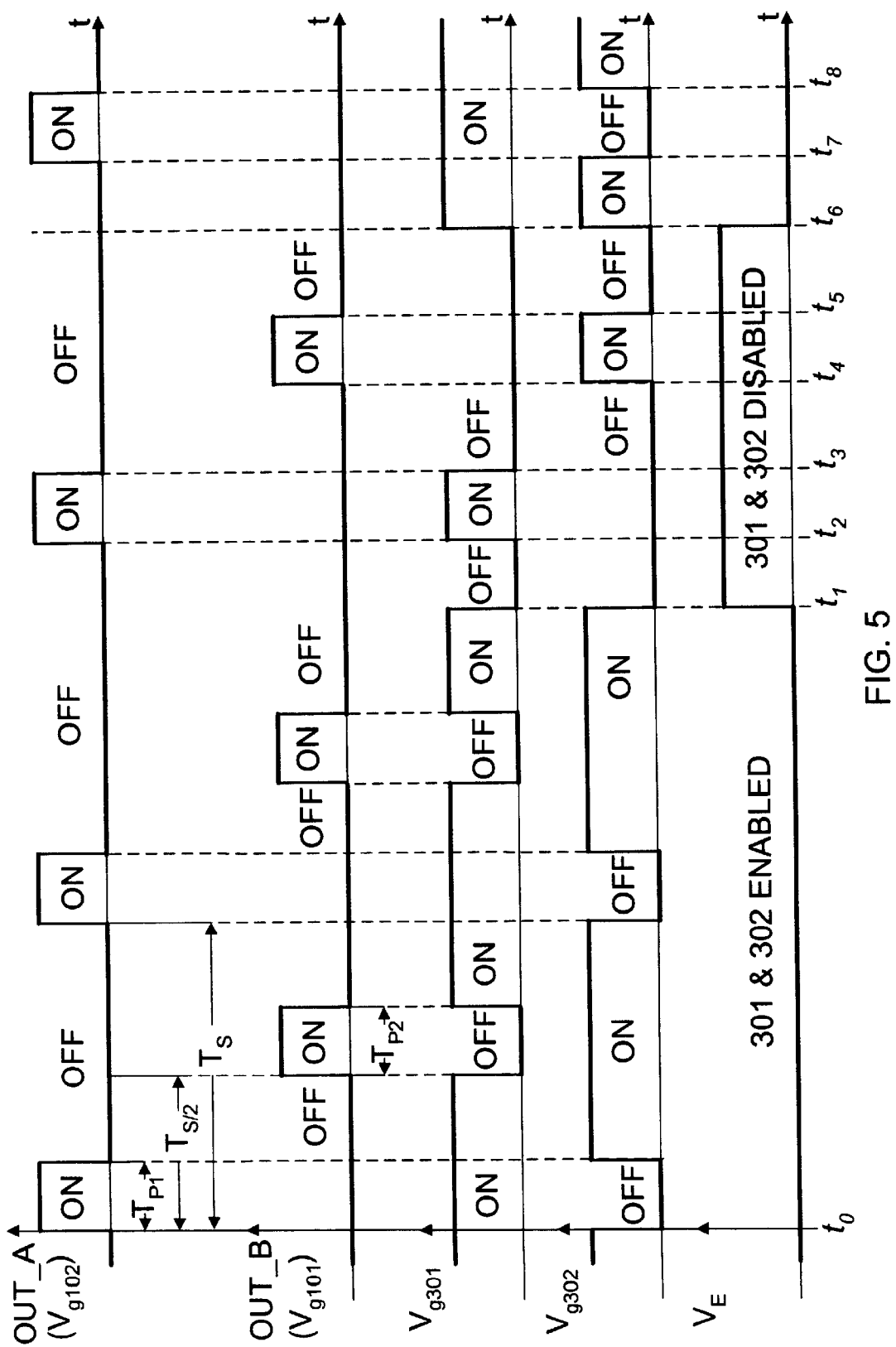
FIG. 5 is the pulse timing diagram for the FIG. 4 embodiment.

In another embodiment of the invention as shown in FIG. 4, two logic gates 503 and 506 are added in order to allow that each synchronous rectifier is turned-on whenever its corresponding primary switch is turned-on, as shown in FIG. 5. The main advantage of this embodiment is that the output voltage will rise faster since voltage at inductor 300 is higher by a diode voltage drop (there could be an external diode across the synchronous rectifiers or the internal body diode of the MOSFET) than it is in the circuit in FIG. 1.

Referring now to FIG. 5, when $V_E$ goes to high logic level at $t=t_1$, both synchronous rectifiers 301 and 302 are turned-off. At, $t=t_2$, OUT_A goes high and primary switch 102 is turned-on, as is synchronous rectifier 301. When OUT_A goes low at $t=t_3$, both primary switch 102 and synchronous rectifier 301 are turned-on. Similarly, at $t=t_4$, OUT_B goes high and primary switch 101 is turned-on, as is synchronous rectifier 302. When OUT_B goes low at $t=t_5$, both primary switch 101 and synchronous rectifier 302 are turned-off. Drive waveforms resume their normal operation at time $t=t_6$ when $V_E$ becomes logic level low.

Figure 6:
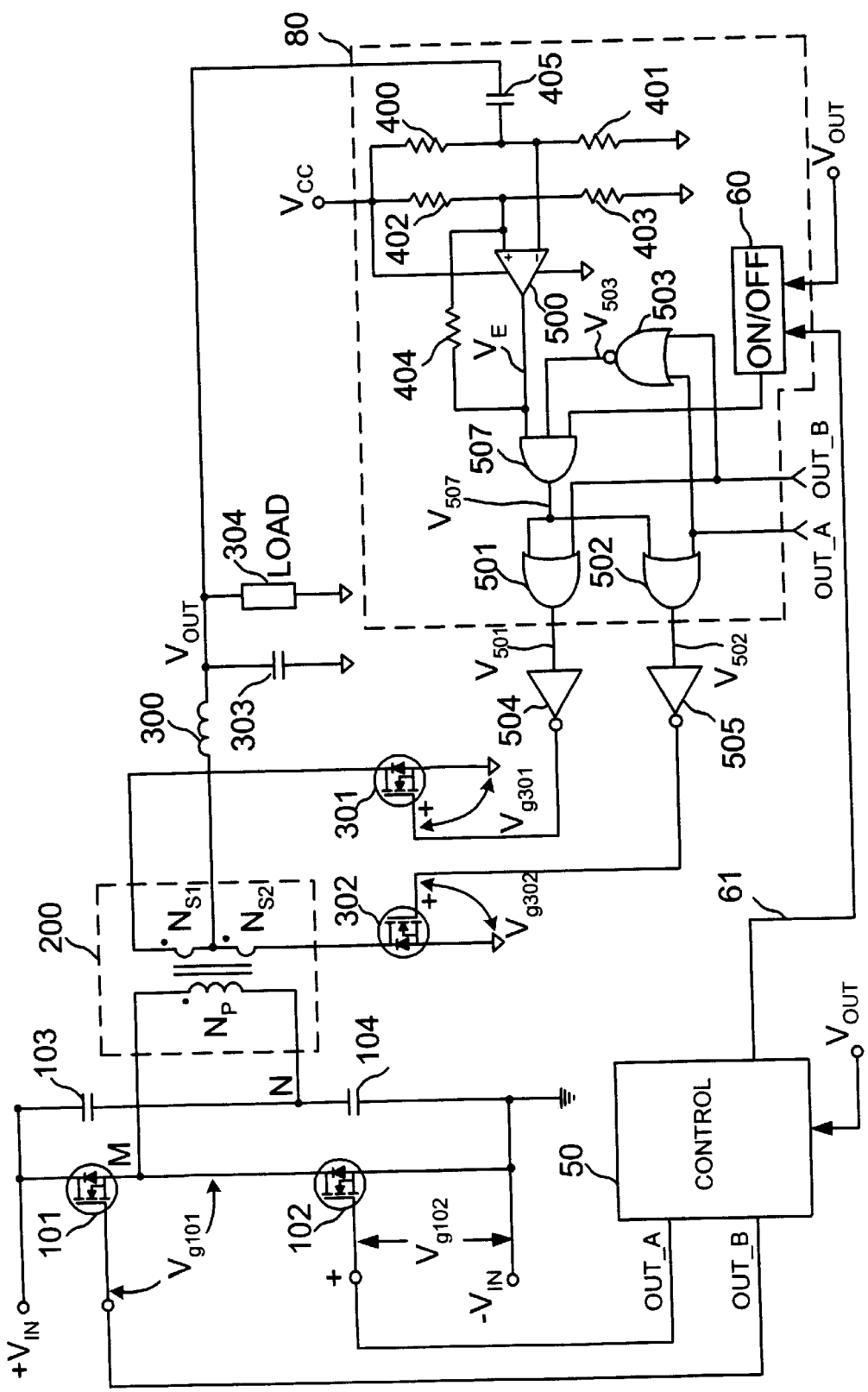
FIG. 6 is another alternative embodiment of the controller of the invention.

In yet another embodiment, as shown in FIG. 6, ON/OFF circuit 60 for disabling output $V_E$ of comparator 500 is added. Two-input logic gate 506 from FIG. 4 is replaced with three-input logic gate 507 in FIG. 6, and the output of ON/OFF circuit 60 is fed into the third input of logic gate 507. In one realization ON/OFF circuit 60 generates a low logic level signal on its output after predetermined time $T_{ON/OFF}$ from the time when the converter was turned-on. In this manner, comparator 500 can affect operation of synchronous rectifiers 301 and 302 only during time $T_{ON/OFF}$.

In another embodiment, also shown in FIG. 6, ON/OFF circuit 60 senses the output voltage and based on the status of the output voltage (for example, $V_{OUT}$ is within 90% of its nominal value) generates a high logic level signal to disable signal $V_E$ from controlling synchronous rectifiers 301 and 302.

In yet another embodiment, ON/OFF circuit 60 generates a high logic level signal on its output whenever the converter is in a turn off sequence. This is an application where the turn off characteristic of the converter will be controlled by comparator 500, thus allowing that comparator 500 controls synchronous rectifiers 301 and 302 during the turn off sequence. ON/OFF circuit 60 receives, for example, logic low signal 61 from the control circuit 50 whenever converter is turned-off and enables signal $V_E$ to control conduction of the synchronous rectifiers 301 and 302. Since It should be understood that the foregoing embodiment is exemplary for the purpose of teaching the inventive aspects of the present invention that are covered solely by the appended claims and encompasses all variations not regarded as a departure from the spirit and scope of the invention. All such modifications as would occur to one of ordinary skill in the art are intended to be included within the scope of the following claims.

What is claimed is:

1. For use in a power converter having a power switch and a synchronous rectifier device coupled between an input and an output thereof, a control circuit, comprising:
   a synchronous rectifier controller, coupled to said synchronous rectifier device, that senses a time derivative of the output voltage of the power converter and disables said synchronous rectifier device when said time derivative is negative and greater than a predetermined magnitude.

2. The control circuit as recited in claim 1 wherein said synchronous rectifier device is located in a discharge path between an inductor and an output capacitor of said power converter.

3. The control circuit as recited in claim 1 wherein said power converter further comprises a plurality of synchronous rectifier devices, said synchronous rectifier controller adapted to disable at least one of said plurality of synchronous rectifier devices.

4. The control circuit as recited in claim 1 wherein said power converter further comprises a plurality of power switches, said synchronous rectifier controller adapted to disable said synchronous rectifier device when at least one of said plurality of power switches is in said non-conducting state.

5. The control circuit as recited in claim 1 wherein said predetermined magnitude is less than five percent of nominal output voltage.

6. The control circuit as recited in claim 1 wherein said synchronous rectifier controller comprises at least one logic gate to enable or disable corresponding at least one synchronous rectifier; and differentiating means for sensing said time derivative of said output voltage.

7. The control circuit as recited in claim 6 wherein said differentiating means comprises:
   a comparator having an inverting input and a non-inverting input:
   a resistor network wherein the resistance of each said resistor is chosen to determine the steady state voltages at said inverting and non-inverting inputs of said comparator and said predetermined magnitude of transient; and
   a capacitor coupled between said output of said power converter and said one input of said comparator, the capacitance of said capacitor together with resistance of said resistors connected to said one input of said comparator define a time constant, said time constant is chosen of sufficient length to allow for proper operation of said power converter during turn-on into said output with a nonzero voltage present.

8. The control circuit as recited in claim 6 wherein said synchronous rectifier controller further comprises an ON/OFF circuit for disabling said comparator after converter is turned-on and output voltage is in regulation.

9. The control circuit as recited in claim 8 wherein said ON/OFF circuit disables said comparator after predetermined time from the moment when said converter is turned-on.

10. The control circuit as recited in claim 8 wherein said ON/OFF circuit senses the output voltage of said converter and disables said comparator when the output voltage reaches predetermined percentage of its nominal value during turn-on sequence.

11. For use in a power converter having a power switch and a synchronous rectifier device coupled between an input and an output thereof, a method of disabling said synchronous rectifier device, comprising:
    differentiating the output voltage of said power converter;
    disabling said synchronous rectifier device when the time derivative of the output voltage of said power converter is negative and greater than a predetermined magnitude.

12. The method as recited in claim 11 further comprising positioning said synchronous rectifier device in a discharge path between an inductor and an output capacitor of said power converter.

13. The method as recited in claim 11 wherein said power converter further comprises a plurality of synchronous rectifier devices, the method further comprising disabling at least one of said plurality of synchronous rectifier devices.

14. The method as recited in claim 11 wherein said power converter further comprises a plurality of power switches, the method further comprising disabling said synchronous rectifier device when at least one of said plurality of power switches is in said non-conducting state.

15. The method as recited in claim 11 wherein said predetermined magnitude is less than five percent of nominal output voltage.

16. The method as recited in claim 1 wherein the act of disabling is performed by a synchronous rectifier controller comprising at least one logic gate to enable or disable corresponding at least one synchronous rectifier and differentiating means for sensing said time derivative of said output voltage.

17. The method as recited in claim 16 wherein said differentiating is performed by a comparator having an inverting input and a non-inverting input, a resistor network and a capacitor.

18. The method as recited in claim 16 further comprising disabling of said comparator by an ON/OFF circuit after said power converter is turned-on and output voltage is in regulation.

19. The method as recited in claim 18 further comprising disabling of said comparator by said ON/OFF circuit after predetermined time from the moment when said converter is turned-on.

20. The method as recited in claim 18 further comprising of said comparator by said ON/OFF circuit when the output voltage of said power converter reaches predetermined percentage of its nominal value during turn-on sequence.

21. A power converter, comprising:
    a power switch coupled to an input of said power converter;
    an inductor coupled to said power switch:
    an output capacitor coupled to an output of said power converter;
    a synchronous rectifier device located in a discharge path between said inductor and said output capacitor; and
    a control circuit, comprising:
       a synchronous rectifier controller coupled to said synchronous rectifier device, that senses a time derivative of the output voltage of the power converter and disables said synchronous rectifier device when said time derivative is negative and greater than a predetermined magnitude.

22. The power converter as recited in claim 20 further comprising a plurality of power switches, said synchronous rectifier controller adapted to disable said synchronous rectifier device when at least one of said plurality of power switches is in said non-conducting state.

23. The power converter as recited in claim 20 further comprising a plurality of power switches, said synchronous rectifier controller adapted to disable said synchronous rectifier device when at least one of said plurality of power switches is in said non-conducting state.

24. The power converter as recited in claim 20 wherein said predetermined magnitude is less than five percent of nominal output voltage.

25. The power converter as recited in claim 20 wherein said synchronous rectifier controller comprises at least one logic gate to enable or disable corresponding at least one synchronous rectifier; and differentiating means for sensing said time derivative of said output voltage.

26. The power converter as recited in claim 20 wherein said differentiating means comprises:

- a comparator having an inverting input and a non-inverting input;
- a resistor network wherein the resistance of each said resistor is chosen to determine the steady state voltages-at said inverting and non-inverting inputs of said comparator and said predetermined magnitude of transient; and a capacitor coupled between said output of said power converter and said one input of said comparator, the capacitance of said capacitor together with resistance of said resistors connected to said one input of said comparator define a time constant, said time constant is chosen of sufficient length to allow for proper operation of said power converter during turn-on into said output with a nonzero voltage present.

27. The power converter as recited in claim 20 wherein said synchronous rectifier controller further comprises an ON/OFF circuit for disabling said comparator after converter is turned-on and output voltage is in regulation.

28. The power converter recited in claim 20 wherein said ON/OFF circuit disables said comparator after predetermined time from the moment when said converter is turned-on.

29. The power converter as recited in claim 20 wherein said ON/OFF circuit senses the output voltage of said converter and disables said comparator when the output voltage reaches predetermined percentage of its nominal value during turn-on sequence.

* * * * *